Patented July 12, 1938

2,123,218

UNITED STATES PATENT OFFICE 2,123,218

METHOD OF MAKING THERAPEUTIC COMPOUNDS

Ossip B. Wanshenk, New York, N. Y., assignor, by mesne assignments, to Kraft-Phenix Cheese Corporation, Chicago, Ill., a corporation of Delaware No Drawing. Application September 29, 1933, Serial No. 691,502

4 Claims. (Cl. 99—57)

My invention relates to nutritional and therapeutic products made from milk and the process for producing the same.

More particularly my invention relates to the recovery and concentration in a stable form of the complex mineral components of milk and the utilization of these components in preparing nutritional compounds having a composition proportionally similar to that of milk with a beneficial increase in the important mineral components and either with or without a specific flora such as Bacillus bulgaricus or of a composition varied according to the particular desire.

It is known that a fermented milk drink called "koumiss" has been used for many years by certain nomad tribes who inhabit the Russian steppes. Koumiss is prepared from mare's milk by fermentation. A similar milk beverage called "kephir" is formed by fermentation set up in cow's milk by a flora similar to that used in koumiss and substantially the same end products are obtained. These tribes found that koumiss, for example, was very efficacious in the treatment of many diseases and ailments. However, in order to obtain the beneficial results it was necessary to consume very large amounts of such beverage apparently because the proportion of the curative substances in the beverage was small.

I have found that the most essential ingredients of these fermented milk beverages are the complex mineral components, especially those containing calcium, and that it is from these that the beneficial effects in connection with certain diseases are primarily obtained.

One of the primary objects of my invention, therefore, is the perfection of a process by which these valuable mineral components in milk may be separated and utilized in their most effective form.

Another object of my invention is to obtain in concentrated form a stable complex protein mineral product derived from milk.

A further object of my invention is to produce an edible material derived from milk and having therein in desired proportions the effective complex protein mineral compound of milk.

Other objects and advantages of my invention will become apparent from the following description.

In general, there are two methods for extracting the casein from milk. One of these methods consists in using rennin which coagulates the casein and permits the separation of the casein as curds leaving a milk serum known as whey. The type of whey produced by this method is called sweet whey. It is produced in making certain cheeses and is usually considered as a waste product.

A second method for separating casein from a milk is to cause the coagulation or curdling by means of an acid either directly added, such as by means of hydrochloric acid, acetic or preferably lactic acid, or by means of the addition of a lactic acid bacillus, such as the Bacillus bulgaricus, which will form lactic acid in the milk and thus cause the coagulation and separation of the casein from the milk serum. The whey resulting from this second method is acidic and is called sour whey. This type of whey is produced in making certain cheeses, namely, cottage cheese and to a certain extent, cream cheese. It is also a waste product and previously there sometimes has been difficulty in disposing of it. I may utilize both of these types of whey from cheese manufacturing process which were formerly considered waste or I may produce a whey specifically for my process if the supply of such waste wheys from these cheese manufactures is not sufficient.

I have found that in coagulating and separating the casein from milk by means of rennin, resulting in the formation of a sweet whey that a certain amount of the desired mineral components including a protein-mineral component was lost in the separation. This separation of these components from the sweet whey apparently is of both a mechanical and a chemical nature, the coagulated material tending to carry off and also combine with mineral components.

I have found, for example, that sweet whey from cheese manufacture has a deficiency in its mineral components of about 40–50% of the mineral content normally present in a milk. This is due to the treatment with rennin which takes from the whey a certain amount of milk minerals. The major portion of this mineral content removed is calcium, calculated as calcium oxide. Thus, the milk mineral balance in the whey is destroyed and it is deficient in a most essential and important ingredient. In this state it is not suitable for nutrition or treatment purposes from a biological and clinical standpoint unless the milk minerals are restored.

On the other hand, I have found that there is very little loss of milk minerals in producing a sour whey, such as by lactic acid bacillus or by the direct addition of a coagulating acid. Due to the acid condition of the whey, the milk mineral salts tend to stay in solution in the whey and thus are not separated by the acid coagulation of the casein. Such sour whey, therefore, is a more suitable starting material from which to obtain the milk mineral salts than sweet whey, although the latter may be used.

I have found that upon adding alkaline substances to sour whey a precipitate is formed and this precipitate I found to be a complex compound or mixture of materials of protein and mineral components, such as calcium, magnesium, phosphorous, sulphur and others.

Biological and clinical investigations have shown that this compound or mixture is very useful for human growth and development and is a valuable medicine for many diseases, particularly where malnutrition or other metabolic disturbances exist. I have found that this protein mineral compound or mixture called protein calcium exists in whey in the amount of about 0.3%. About one-half of this compound or mixture is a protein-like substance, probably a proteid, as it gives a weak Millon reaction. Protein calcium is a white amorphous powder soluble in acidified water and other acid mediums. It rapidly decomposes in the presence of alkalies upon standing at ordinary temperatures and even more rapidly upon heating. Boiling and even pasteurization temperatures decompose it into albuminous and inorganic parts. It is necessary, therefore, in order to utilize this valuable component of milk to separate the protein calcium in some stable form and yet not destroy its effective characteristics from a nutritive and therapeutic standpoint.

I have found a method by which the protein mineral component of milk can be obtained in a stable form and which has the desired nutritive and therapeutic properties and further which can be mixed with other components of milk to form nutritive products of unusual merit. It is understood, of course, that the composition of milk is variable so my method must be adapted to the particular milk used as a starting material.

I have already stated that I may use as a starting material the waste product from a cheese manufacturing process, namely, whey. I preferably use sour whey, such as is produced in the manufacture of cottage cheese, as this material has a greater percentage of the complex protein mineral compounds or mixtures which I desire to recover in a stable form. However, I may use sweet whey although such whey has lost a portion of its mineral components due partially to the action of the substance, such as rennin, with which it is coagulated. As I have already mentioned, if the supply of such waste materials from cheese manufacturing processes is not sufficient, or for other reasons, I may prepare my whey directly from milk, and in describing the operation of my process, I have included, therefore, the process for the preparation of whey from milk.

One method for the preparation of a desirable whey from which to obtain my stable complex protein mineral component is to add to milk from which some of the fat has been separated a lactic acid forming bacillus, such as, for example, *Bacillus bulgaricus*. Also acids, such as hydrochloric, sulphuric, acetic or the direct addition of lactic acid, may be used directly as the coagulating medium. Coagulation takes place due to the acidity formed in the milk and casein separates in the form of curds, leaving a milk serum which is a sour whey. Several alternative forms of operation for the production of the whey, of course, are available. For example, a sweet whey may be used as already stated. Such a whey might be prepared by the use of rennin or rennin in combination with an acid forming bacillus, or with the addition directly of coagulating acids. I prefer to use a whey either formed as a waste product as, for example, in cheese manufacture, or for my specific purpose which has in it the greatest percentage of protein mineral components. In these methods the coagulated mixture is warmed to about 140 to 150° F. which causes the curds to contract and facilitates the separation of the liquid from the solid material. The curds are also cut several times with a wire sieve to break them down into very small pieces to permit a complete separation of the liquid and solid components. The curds may then be removed by means of a cloth filter and as complete a recovery as possible of the whey obtained.

The whey is preferably filtered again to remove any remaining proteid constituents, such as casein, left in the whey after the separation of the curds. This material tends to be carried down by the protein calcium subsequently precipitated and affects the stability of this protein mineral component. The amount of such proteid material remaining in the whey after separation of the curds varies and is dependent to a degree upon the type of milk and also upon the method of precipitating and separating the curds. Thus, unless this material is removed, it would in addition to affecting the stability also tend to affect the amount, as well as uniformity, of the complex protein calcium material subsequently precipitated. After this filtration, the whey is then ready for treatment to recover the complex proteid mineral components contained therein.

The next step consists in making alkaline the sour whey and precipitating the protein calcium component, by means of an alkaline reagent. My preferred reagent is a 0.3 to 0.5% solution of ammonium hydroxide. Other alkaline agents, such as an alkaline compound of the alkali metals, for example sodium bicarbonate, sodium hydroxide and certain organic alkaline agents, may be used. I have found that the use of ammonium hydroxide is preferable because ammonia is volatile and the excess is easily eliminated as will be discussed later. If a non-volatile alkaline agent is employed, the excess should also be removed from the precipitate as soon as possible.

There are three factors which directly bear upon the amount of alkaline agent to be added in precipitating the complex protein calcium material and this precipitation step is one of the important features of my process. The amount of ammonium hydroxide to be added is affected by (a) the amount of protein calcium in the milk which varies and is dependent upon the milk used; (b) the amount of acid present in the sour whey which is also variable; and (c) the fact that a surplus of ammonium hydroxide tends to split the complex protein mineral material whereupon it goes into solution with a consequent lower yield. Therefore in order to determine the exact amount of ammonium hydroxide precipitating material to be used with a given batch of prepared sour whey I have found it desirable to run a test sample before alkalinizing my main body of whey. The dilute solution of ammonium hydroxide is added slowly to a given sample until it becomes alkaline after which it is added drop by drop until a precipitate appears in the solution. The addition of the dilute precipitating agent is continued until one drop more shows no further precipitation. I therefore do not have any substantial excess of alkaline material. From the amount of ammonium hydroxide solution used in obtaining a maximum precipitation in the sample used, the amount of ammonium solution necessary to precipitate the protein calcium from the main batch can be calculated. This amount is then added to the main batch or body of whey and the proteid mineral component precipitated. The precipitate thus formed is then rapidly separated from the whey preferably by centrifuging and the whey may be removed from the precipitate in any convenient manner such as by an aspirator.

If desired, the protein calcium precipitated material may then be washed with water and again centrifuged and placed in a dryer where it should be dried as rapidly as possible in order to remove the volatile ammonium hydroxide alkaline reagent. I have found it desirable to dry by passing heated air at a temperature between 100 and 150° F. over a thin film of protein calcium material. It is also preferable in order to avoid impurities in the product to clean the air both physically and bacteriologically. The important factor in this process is the time element and it is desirable to dry the protein calcium as rapidly as possible after its separation to prevent decomposition. It is also important to remove the alkaline precipitating agent as rapidly as possible for I have found that the rate of decomposition of the protein calcium is greatly diminished after the alkaline precipitating agent has been removed. For this reason it is particularly advantageous to use an alkaline precipitating reagent such as ammonia which is readily volatile at the drying temperatures and which can be quickly removed. As a result the material produced has a small or negligible amount of products of decomposition.

I have found it desirable in order to further increase the stability of my product to immediately remove the protein calcium material precipitated by the ammonia from the sour whey and dissolve it into weak acid solution such as a 0.3% to 0.5% hydrochloric acid solution. A dilute acetic acid solution may also be used. The acid solution containing the redissolved protein calcium component is then preferably filtered after which the protein calcium is again reprecipitated with a dilute solution of ammonium hydroxide such as originally used.

I also prefer to run a test sample before alkalinizing my main body of whey as described above in connection with the precipitation of the material from sour whey. This dissolving of the protein calcium material with acid and then reprecipitating a stabilized product with ammonia may be carried on several times if desired. The reprecipitated material is then separated by centrifuging and washed after which it is dried in a current of heated air to remove all traces of alkaline reagent and moisture. As discussed above, the important factor in this process is the time element and it is desired to dry the protein calcium as rapidly as possible after this separation to prevent decomposition. This is also accomplished by removing the alkaline precipitating reagent as rapidly as possible, and it is preferable, therefore, to use a volatile reagent such as ammonia. The air, of course, is preferably cleaned both physically and bacteriologically in order to avoid impurities in the proteid mineral material from bacteriological contamination.

The protein calcium precipitated from the sour whey may contain only approximately 40 to 75% complex proteid calcium components, the remainder being fats, proteins, casein, a complex mixture of materials originally present in the milk. There is a tendency for these materials to decompose, particularly the fatty materials, which become rancid and this decomposition I have found spreads rapidly and tends further to decompose the complex protein mineral material. However, by dissolving such sour whey precipitate in acid and reprecipitating, a stabilized precipitate containing 92 to 99% of complex protein mineral material can be obtained. Thus a protein mineral product is made available which has further increased the stable properties.

The dried protein calcium material is preferably reduced to a powder by passing it between rollers which breaks it into flakes and then grinding the flakes in a French mill. It is important in these grinding operations that no local overheating takes place which would tend to break down or decompose the material.

The precipitate contains a proportion of a mineral component and a proportion of a protein component or complex, as well as a proportion of moisture. The precipitate contains calcium, phosphorus, magnesium and sulphur, as well as small percentages of additional natural substances, the amounts dependent upon the type of milk or whey used as the starting material. It can be seen, therefore, that this material which I have separated is an unusual complex substance. On the other hand I have found that by my process I am able to obtain a product having all the desired nutritive and therapeutic properties and yet one which is relatively stable, which may be made up in large quantities and shipped or stored without the necessity for unusual precautions in handling.

I have further found that I can increase the nutritive biological and therapeutic properties of my stable protein-calcium by combining it with sweet whey. Such a product may be advantageously used by adding the precipitated protein-calcium to the sweet whey. A preferred method of preparing my sweet whey is to add a small amount of bacillus, such as *Bacillus bulgaricus*, to milk and allow the reaction to take place for about fifteen minutes at body temperature. Rennin is then added which causes coagulation of the caseinogen after about one-half hour. The lactic acid formed by the *Bacillus bulgaricus* hastens the action of the rennin. The protein separates in this case also in the form of curds, leaving as the liquid a sweet whey. It is preferable also in connection with the preparation of this sweet whey to warm the coagulated mixture to about 140 to 150° F. in order to facilitate the separation of the liquid from the solid material and inhibit the further formation of lactic acid. When as complete a separation as possible has been obtained, the curds may be removed by filtration and a whey free from foreign matter obtained.

It is not necessary that the protein calcium be dried before being added to the sweet whey although, if desired, such an operation may be carried out. After the protein calcium precipitate has been mixed with the sweet whey, the solution is passed preferably to a spray drier where drying to a powder can be carried out as rapidly as possible. In this case, also, the rapidity with which the drying takes place is an essential element to the success of the process.

The sweet whey used may be of any desired type, such wheys varying in composition depending for one thing upon the milk from which it was derived. To the sweet whey I add from 2 to 5% of the stable protein calcium material and it was found that this protein mineral combination which I call "PMC" contains a sufficient amount of protein calcium material to produce the desired nutritive and therapeutic effect. For example, my protein mineral combination may have the following composition: 9–11% minerals, 1.18% fats, 12.24% protein, 70.0% lactose, 3.15% moisture.

It should be appreciated that in producing my sweet whey by the method described specifically, namely, by the addition of lactic acid forming bacillus and rennin that a certain proportion of lactic acid is produced in the whey to which my stable protein calcium material is added. The presence of this lactic acid in the resulting dry protein mineral combination is of importance because it greatly facilitates the absorption of the mineral components into the system. The lactose present in the whey, due to its conversion to lactic acid during digestion, also aids greatly in the solution and absorption and assimilation of the protein calcium. If desired, of course, the protein calcium material may be dried and mixed with a dry material obtained from sweet whey rather than with the liquid whey, although the completeness of the mixture might not be as desirable as that obtained by the methods outlined above.

This application is a continuation in part of my copending applications Serial Nos. 631,581; 631,582; 631,583 and 642,453.

What I claim is:

1. The method of recovering a stable nutritive mineral product from whey which comprises adding substantially the minimum quantity of ammonia to the whey to precipitate a complex protein mineral substance, substantially immediately thereafter separating the precipitate from the solution and drying said precipitate, whereby a substance is obtained substantially free from products of decomposition.

2. The method of producing a stable nutritive mineral product from milk which comprises separating the casein therefrom by the action of an acid forming bacillus, removing the casein, adding substantially the minimum quantity of ammonia to the whey to precipitate a complex protein mineral substance, substantially immediately thereafter separating the precipitate from the solution and drying said precipitate, whereby a substance is obtained substantially free from products of decomposition.

3. The method of recovering a stable nutritive mineral product from whey which comprises adding an alkaline material to the whey to precipitate a complex protein mineral substance, separating the precipitate from the solution, redissolving the precipitate in an acid solution, reprecipitating said complex protein mineral substance by the addition of an alkaline material to said acid solution, substantially immediately thereafter separating the precipitate from the solution, whereby a substance is obtained substantially free from products of decomposition.

4. The method of producing a stable nutritive mineral product from milk which comprises separating the casein from the milk by the action of an acid, removing the casein, adding an alkaline material to the whey to precipitate a complex protein mineral substance, separating the precipitate from the whey, dissolving said precipitate in an acid solution, reprecipitating said complex protein mineral substance by the addition of an alkaline material to said acid solution, substantially immediately thereafter separating the precipitate from the solution whereby the substance is obtained substantially free from products of decomposition.

OSSIP B. WANSHENK.